US009100279B2

(12) United States Patent
Ge (10) Patent No.: US 9,100,279 B2
(45) Date of Patent: Aug. 4, 2015

(54) METHOD, APPARATUS, AND SYSTEM FOR FORWARDING DATA IN COMMUNICATIONS SYSTEM

(71) Applicant: Huawei Technologies Co., Ltd., Shenzhen, Guangdong (CN)

(72) Inventor: Xinyu Ge, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 121 days.

(21) Appl. No.: 13/928,906

(22) Filed: Jun. 27, 2013

(65) Prior Publication Data
US 2013/0287031 A1 Oct. 31, 2013

Related U.S. Application Data (63) Continuation of application No. PCT/CN2011/084129, filed on Dec. 16, 2011.

(30) Foreign Application Priority Data

Dec. 31, 2010 (CN) .......................... 2010 1 0619765

(51) Int. Cl.
*H04L 12/56* (2006.01)
*H04L 12/701* (2013.01)
(Continued)

(52) U.S. Cl.
CPC .............. *H04L 45/00* (2013.01); *H04L 45/306* (2013.01); *H04L 67/2804* (2013.01); *H04L 47/34* (2013.01)

(58) Field of Classification Search
CPC ... H04L 45/00; H04L 45/306; H04L 67/2804; H04L 1/1621; H04L 1/1628; H04L 1/18; H04L 47/34; H04L 1/1841; H04L 49/9057; H04L 1/1635; H04L 1/1642
USPC ............................................................ 370/3
See application file for complete search history.

(56) References Cited

U.S. PATENT DOCUMENTS 5,995,726 A * 11/1999 Dillon .......................... 709/231
6,687,222 B1 2/2004 Albert et al.
(Continued)

FOREIGN PATENT DOCUMENTS

CN 1578320 A 2/2005
CN 101325552 A 12/2008
(Continued)

OTHER PUBLICATIONS

Written Opinion of the International Searching Authority in corresponding PCT Patent Application No. PCT/CN2011/084129 (Mar. 29, 2012).
(Continued)

*Primary Examiner* — Candal Elpenord
(74) *Attorney, Agent, or Firm* — Leydig, Voit & Mayer, Ltd.

(57) ABSTRACT

Embodiments of the present invention disclose a method, an apparatus, and a system for forwarding data in a communications system. The implementation of the method includes: A data forwarding device forwards a data packet from a source end to a destination end by using a low-speed channel; during a procedure for forwarding the data packet from the source end to the destination end by using the low-speed channel, the data forwarding device receives a control command sent by a service processing node, where the control command is used to indicate that the data packet of the source end does not need to be forwarded to the service processing node; and the data forwarding device forwards the data packet from the source end to the destination end according to the indication of the control command by using a high-speed channel.

9 Claims, 3 Drawing Sheets

(51) Int. Cl.
*H04L 29/08* (2006.01)
*H04L 12/725* (2013.01)
*H04L 12/801* (2013.01)

(56) References Cited

U.S. PATENT DOCUMENTS

| | | | |
|---|---|---|---|
| 7,130,266 B2 * | 10/2006 | Virtanen et al. | 370/230 |
| 7,826,487 B1 * | 11/2010 | Mukerji et al. | 370/477 |
| 7,921,285 B2 * | 4/2011 | Partridge et al. | 713/160 |
| 8,004,983 B2 * | 8/2011 | Li | 370/231 |
| 2002/0150088 A1 * | 10/2002 | Yoshino et al. | 370/362 |
| 2004/0006643 A1 * | 1/2004 | Dolson et al. | 709/246 |
| 2004/0179542 A1 * | 9/2004 | Murakami et al. | 370/413 |
| 2007/0230461 A1 * | 10/2007 | Singh et al. | 370/389 |
| 2008/0130561 A1 * | 6/2008 | Shao et al. | 370/329 |

FOREIGN PATENT DOCUMENTS

| | | |
|---|---|---|
| CN | 102137005 A | 7/2011 |
| WO | WO 2010061573 A1 | 6/2010 |

OTHER PUBLICATIONS

International Search Report in corresponding PCT Patent Application No. PCT/CN2011/084129 (Mar. 29, 2012).

* cited by examiner

METHOD, APPARATUS, AND SYSTEM FOR FORWARDING DATA IN COMMUNICATIONS SYSTEM

CROSS-REFERENCE TO RELATED APPLICATIONS

This application is a continuation of International Patent Application No. PCT/CN2011/084129, filed on Dec. 16, 2011, which claims priority to Chinese Patent Application No. 201010619765.5, filed on Dec. 31, 2010, both of which are hereby incorporated by reference in their entireties.

FIELD OF THE INVENTION

The present invention relates to the field of communications technologies, and in particular to a method, an apparatus, and a system for forwarding data in a communications system.

BACKGROUND OF THE INVENTION

When a packet is delivered between a data forwarding device and a service processing node, a request packet and a response packet need to pass through the data forwarding device twice. This increases the bandwidth requirement for the data forwarding device. For example, if the bandwidth requirement for the client and the server is 10 G, the bandwidth for the data forwarding device needs to be 20 G. During a service processing procedure, however, for certain service flows, after protocol recognition or service processing for an uplink request of a terminal, subsequent uplink packets and downlink packets do not need to continue to be forwarded to the service processing node or forwarded back by the service processing node, and may be directly forwarded by the data forwarding device to the terminal and a device of a service provider (Service Provider, SP), thereby reducing the bandwidth requirements and processing pressures for the data forwarding device and service processing node.

In the conventional art, however, data is forwarded by configuring static policies, where the destination IP address and Port rules are configured in advance, and uplink and downlink data packets that comply with static rules are directly routed (that is, data is forwarded by using a high-speed channel). The control manner for forwarding policies is not flexible enough, and there are a large number of restrictions during application, which do not facilitate wide use.

SUMMARY OF THE INVENTION

A technical problem to be addressed by embodiments of the present invention is to provide a method, an apparatus, and a system for forwarding data in a communications system.

To address the preceding technical problem, an embodiment for the method for forwarding data provided in the present invention may be implemented through the following technical solution:

forwarding, by a data forwarding device, a data packet from a source end to a destination end by using a low-speed channel;

during a procedure for forwarding the data packet from the source end to the destination end by using the low-speed channel, receiving, by the data forwarding device, a control command sent by a service processing node, where the control command is used to indicate that the data packet of the source end does not need to be forwarded to the service processing node; and forwarding, by the data forwarding device, the data packet from the source end to the destination end according to the indication of the control command by using a high-speed channel.

A method for forwarding data includes:

receiving, by a service processing node, a data packet from a source end sent by a data forwarding device by using a low-speed channel;

performing, by the service processing node, protocol recognition and packet processing for the data packet, and judging whether data packets subsequently sent by the source end need to be processed by the service processing node; and if not, sending a control command to the data forwarding device to indicate that uplink data packets of the source end do not need to be forwarded to the service processing node so that the data forwarding device forwards the data packet from the source end to a destination end by using a high-speed channel.

A data forwarding device includes:

a low-speed forwarding unit, configured to forward a data packet from a source end to a destination end by using a low-speed channel;

a control command receiving unit, configured to: during a procedure for forwarding the data packet from the source end to the destination end by using the low-speed channel, receive a control command sent by a service processing node, where the control command is used to indicate that the data packet of the source end does not need to be forwarded to the service processing node; and a high-speed forwarding unit, configured to forward the data packet from the source end to the destination end according to the indication of the control command by using a high-speed channel.

A service processing node includes:

a packet receiving unit, configured to receive a data packet from a source end sent by a data forwarding device by using a low-speed channel;

a packet processing unit, configured to perform protocol recognition and packet processing for the data packet from the source end, and judge whether data packets subsequently sent by the source end need to be processed by the service processing node; and a command sending unit, configured to: if the judgment result of the packet processing unit is no, send a control command to the data forwarding device to indicate that uplink data packets of the source end do not need to be forwarded to the service processing node so that the data forwarding device forwards the data packets subsequently sent by the source end to a destination end by using a high-speed channel.

A data forwarding system, including: the data forwarding device and the service processing node provided in embodiments of the present invention.

The technical solutions have the following beneficial effects: According to the embodiments of the present invention, the service processing node determines whether to continue to forward data by using a low-speed channel after service processing, and then controls the data forwarding device to select a high-speed channel for forwarding data. In this way, the policy for dynamically controlling data sending is implemented, the manner for controlling the forwarding policy is flexible, and the restrictions during application are few, facilitating wide use.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following description merely show some embodiments of the present invention, and persons of ordinary skill in the art can further derive other drawings from the accompanying drawings without creative efforts.

DETAILED DESCRIPTION OF THE EMBODIMENTS

The technical solutions of the embodiments of the present invention are hereinafter described clearly and completely with reference to the accompanying drawings in the embodiments of the present invention. Evidently, the described embodiments are only some of the embodiments of the present invention, rather than all embodiments of the present invention. All other embodiments obtained by persons of ordinary skill in the art based on the embodiments of the present invention without creative efforts shall fall within the protection scope of the present invention.

Figure 1A:
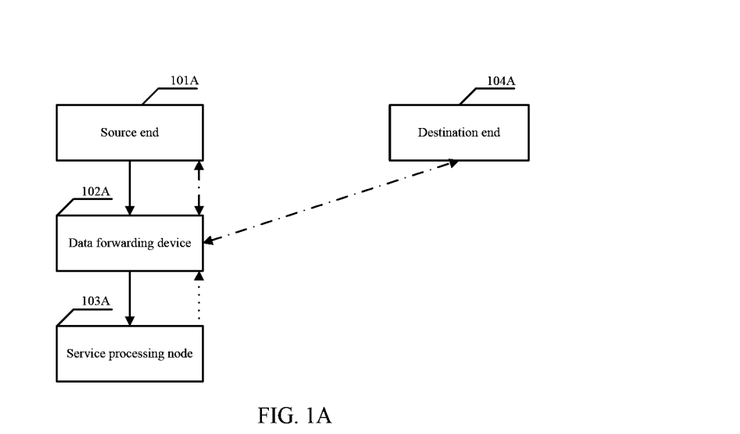
FIG. 1A is a schematic diagram of a data flow direction in a method according to an embodiment of the present invention.
Figure 1B:
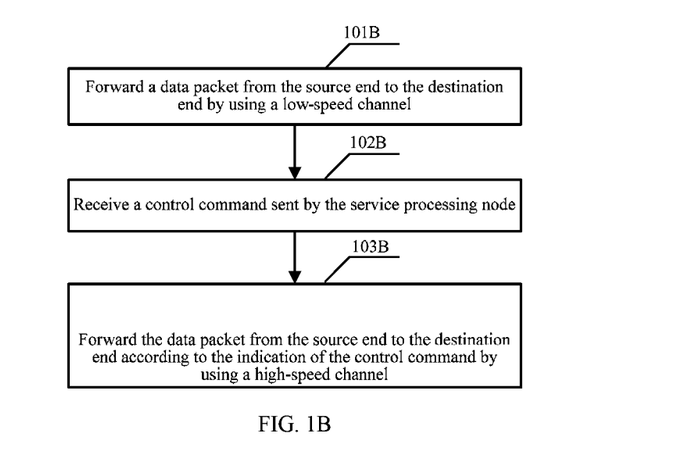
FIG. 1B is a schematic flow chart of a method according to an embodiment of the present invention.

Embodiments of the present invention provide a method for forwarding data, as shown in FIG. 1A. Reference may also be made to FIG. 1B. The execution subject of this method may be a data forwarding device, for example, a load balancer (Load Balancer, LB) and a line card (Line Card, LC). The method includes:

101B: The data forwarding device forwards a data packet from a source end to a destination end by using a low-speed channel 102B: During a procedure for forwarding the data packet from the source end to the destination end by using the low-speed channel, the data forwarding device receives a control command sent by a service processing node, where the control command is used to indicate that the data packet of the source end does not need to be forwarded to the service processing node.

103B: The data forwarding device forwards the data packet from the source end to the destination end according to the indication of the control command by using a high-speed channel.

The method according to FIG. 1B is illustrated in FIG. 1A as follows: The source end 101A sends the data packet to the data forwarding device 102A, and the data forwarding device 102A forwards the received data packet to the service processing node 103A, as indicated by the one-way arrow in solid line; the service processing node 103A sends the control command to the data forwarding device 102A, as indicated by the one-way arrow in dots; the data forwarding device forwards the data packet between the source end 101A and the destination end 104A by using a high-speed channel according to the indication of the control command, as indicated by the two-way arrow.

Specifically, in the specific implementation manner, the data forwarding device provides low-speed channel and high-speed channel functions. In the low-speed channel, data packets need to be sent to the service processing node. The service processing node performs service processing such as protocol recognition and packet modification for the data packets before forwarding the data packets to the data forwarding device, and the data forwarding device forwards packets to the terminal or SP side; that is, in the low-speed channel, uplink and downlink packets need to pass through the load balancer and service processing node twice. Specifically, in the flow of the low-speed channel, the data flow between the data forwarding device and the service processing node is as follows: The data forwarding device distributes uplink data packets of the terminal to the service processing node; after service processing, the service processing node then sends the uplink data packets to the data forwarding device; the data forwarding device then sends the uplink data packets to the SP or content provider (Content Provider, CP). Similarly, the data flow of downlink data packets corresponds to the data flow of uplink data packets, and may be briefly described as "SP/CP—data forwarding device—service processing node—data forwarding device—terminal", and the details are not described herein.

In the high-speed channel, data packets are directly forwarded to the next-hop network device, that is, for uplink and downlink packets between the terminal and the SP or CP, the data forwarding device directly performs layer 3 or layer 4 routing and forwarding for packets. In other words, the uplink and downlink packets are not processed by the service processing node.

With a service scenario where a transparent proxy or interception mode being taken for example, after quintuple information of a service stream in the prior art is processed by the data forwarding device, the quintuple information cannot be changed during interaction with the terminal and the SP or CP. Therefore, in networking and service processing, the prior art requires that all uplink and downlink data packets must pass through the data forwarding device and service processing node. The quintuple information is as follows: Internet Protocol (Internet Protocol, IP) address and port (Port) of the terminal, corresponding IP address and port (Port) of the SP, and protocol type. More specifically, after the service processing node performs packet modification, as transmission control protocol (Transmission Control Protocol, TCP) parameters, for example, packet number and checksum, at both ends are inconsistent, the load balancer cannot make modification of the TCP header reach an effect where subsequent unmodified uplink and downlink packets can be directly routed, and the subsequent unmodified uplink and downlink packets still must pass through the service processing node for transition.

However, in the specific implementation manner, for the service scenario such as the transparent proxy and interception mode, when the service processing node modifies the packet: if the control command sent by the service processing node indicates that the packets do not need to be forwarded to the service processing node, the forwarding the data packet from the source end to the destination end by using a high-speed channel in 103B includes: if the data packet is already modified by the service processing node, recording quintuple information of the source end and destination end, and an offset in data packet modification; and modifying an offset SEQ value and a response ACK value of a transmission control protocol sequence TCP in the data packet from the source end according to the quintuple information of the source end and destination end, and the offset in data packet modification, and forwarding the data packet from the source end to the destination end by using the high-speed channel according to the SEQ (sequence number, SEQ) value and ACK (acknowledge number, ACK) value after modification. The specific modification manner is as follows: Assume that the offset added to the data packet is Payload_len. The SEQ value of the data packet sent by the data forwarding device to the destination end is as follows: SEQ of the source end+payload_len; the ACK value of the data packet sent by the data forwarding device to the source end is as follows: ACK of the destination end−payload_len. Examples will be used for illustration.

More specifically, modifying the sequence number of the data packet from the source end includes:

if the quintuple information remains unchanged, modifying the SEQ value and ACK value of the TCP in the data packet from the source end; and if the quintuple information is already changed, and a maximum segment size (Maximum Segment Size, MSS) of the TCP at the source end is the same as that at the destination end, modifying the SEQ value and ACK value of the TCP in the data packet from the source end according to the offset and replacing the IP address and Port.

Specific modification of the port and sequence number will be described in further detail in subsequent embodiments according to the embodiments of the present invention.

According to this embodiment, the service processing node determines whether to continue to forward data by using a low-speed channel during service processing, and then controls the data forwarding device to select a high-speed channel for forwarding the data. In this way, the policy for dynamically controlling data sending is implemented, the manner for controlling the forwarding policy is flexible, and the restrictions during application are few, facilitating wide use.

When the preceding method is used, for a single-channel service, after protocol recognition and service processing (for example, for a P2P service), only certain application layer data needs to be modified, the service processing node (Node) may deliver a dynamic rule (control command), and the data forwarding device directly routes and forwards subsequent uplink and downlink packets, thereby reducing the bandwidth requirements and processing pressures for the data forwarding device and Node.

A single-channel service indicates a service whose control stream and data stream use a same link. For a single-channel service, after protocol recognition and service processing, for example, hypertext transfer protocol (Hypertext Transfer Protocol, HTTP) service, only certain packets need to be modified. For subsequent uplink and downlink packets, the Node may deliver a dynamic rule, and the data forwarding device records the source end and destination end, for example, modifies the SEQ value and ACK value of the TCP in the uplink and downlink packets according to the offset produced due to packet modification, before routing and forwarding.

A multi-channel service indicates a service whose control stream and data stream use different links Services such as file transfer protocol (File Transfer Protocol, FTP), session initiated protocol (Session Initiated Protocol, SIP), and real-time transport streaming protocol (Real-time Transport Streaming Protocol, RTSP) belong to multi-channel services. For a multi-channel service, the data stream does not require service processing. The service processing node may deliver a control command during system running period (compared with the method where static configurations are preset during system startup, this method belongs to a dynamic policy) so that the data stream is directly forwarded, thereby reducing the bandwidth requirements and processing pressures for the data forwarding device and the Node.

Figure 2:
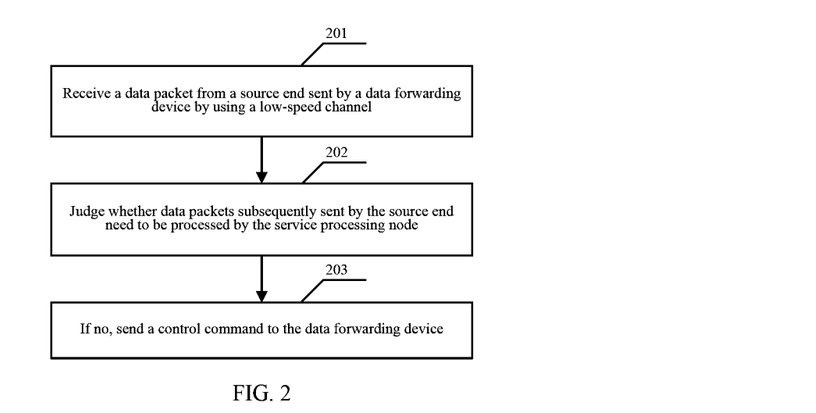
FIG. 2 is a schematic flow chart of a method according to an embodiment of the present invention.

Accordingly, an embodiment of the present invention further provides another method for forwarding data that is described from the view where the subject is a service processing node, as shown in FIG. 2, including:

201: The service processing node receives a data packet from a source end sent by a data forwarding device by using a low-speed channel 202: The service processing node performs protocol recognition and packet processing for the data packet, and judges whether data packets subsequently sent by the source end need to be processed by the service processing node.

203: If not, send a control command to the data forwarding device, where the control command is used to indicate that uplink data packets of the source end do not need to be forwarded to the service processing node, so that the data forwarding device forwards the data packet from the source end to a destination end by using a high-speed channel.

According to this embodiment of the present invention, the service processing node determines whether to continue to forward data by using a low-speed channel after service processing, and then controls the data forwarding device to select a high-speed channel for forwarding the data. In this way, the policy for dynamically controlling data sending is implemented, the manner for controlling the forwarding policy is flexible, and the restrictions during application are few, facilitating wide use.

The solution according to this embodiment of the present invention may be designed based on the traffic model on the existing network. Data packets that need to be processed by the service processing node among the existing network data occupy 37% of overall data packets, and 63% data packets may be directly routed and forwarded after protocol recognition or simple packet modification. Subsequent uplink and downlink data packets do not need to further pass through the service processing node, and may be routed through a high-speed data forwarding device.

In an initial status, initial packets in service streams on all links are sent by the data forwarding device that supports high-speed data forwarding to the service processing node through a low-speed channel. The service processing node performs service logic processing, and judges whether relevant service streams of the user need to continue to be sent to the Node for service processing subsequently.

A manner for judging whether data packet need to be sent to the Node for processing in step 202 may be judging that subsequent data streams do not require relevant processing by the service processing node according to actual needs during the service processing procedure. First, a case where a streaming media video is viewed according to user needs is taken for example. Streaming media has two parts: RTSP control stream and RTP data stream. The RTSP control stream passes through the low-speed channel first. A service logic in the service processing node judges that it is a certain video clip. After a charging or bandwidth control rule is matched, the subsequent RTP data stream may be directly sent (by using the high-speed channel). In addition, a point-to-point (P2P) protocol is taken for example: A TCP/UDP packet first passes through the low-speed channel. After recognizing the P2P protocol, the service processing node obtains the bandwidth control rule. The subsequent data stream may directly pass through the high-speed channel, does not need to pass through the service processing node, and only needs to execute a bandwidth control policy interface.

When the service processing node (Node) judges that no service processing is required, the Node delivers a control instruction carrying relevant information to the data forwarding device in step 203. The relevant information is used to identify that "subsequent uplink request and downlink response do not need to be forwarded to the Node." In this way, the data forwarding device may directly forward uplink and downlink packets.

The processing logic supported by the data forwarding device in the embodiments as shown in FIG. 1 and FIG. 2 includes:

managing all uplink and downlink packets based on a connection;

accepting and executing an allow or not-allow policy based on a connection table;

managing SEQ/ACK values of TCP packets in all connections in the high-speed channel; and supporting management of a default policy (that is, forwarding data by using the low-speed channel initially), user level policy and/or connection level policy (that is, selecting the high-speed channel for data forwarding through a control instruction).

An embodiment of the present invention further provides a policy interface between the data forwarding device and the service processing node (Node), as described in Table 1.

TABLE 1

| Interface Description | Notification of the allow or not-allow policy |
|---|---|
| Input Parameter | Policy type (allow/not-allow) |
| | CID (Connection ID): connection ID, where CID is the logic ID of quintuple |
| | uplink_ms_seq: SEQ value at the uplink terminal side |
| | uplink_ms_ack: ACK value at the uplink terminal side |
| | uplink_sp_seq: SEQ value at the uplink SP side |
| | uplink_sp_ack: ACK value at the uplink SP side |
| | uplink_offset: uplink offset |
| | downlink_ms_seq: SEQ value at the downlink terminal side |
| | downlink_ms_ack: ACK value at the downlink terminal side |
| | downlink_sp_seq: SEQ value at the downlink SP side |
| | downlink_sp_ack: ACK value at the downlink SP side |
| | downlink_offset: downlink offset |

This embodiment of the present invention further provides a processing manner when a packet is modified by the Node during packet processing:

The data forwarding device needs to record the SEQ values and ACK values at the network access server (Network Access Server, NAS) side and SP side, and the offset produced during modification of the data packet, and modifies the SEQ value and ACK value of TCP before forwarding uplink and downlink packets.

Specifically, in the scenario where the quintuple information of the connection between the source end and the destination end is not changed, the data forwarding device only needs to modify the TCP SEQ/ACK value; in the scenario where the quintuple information of the connection between the source end and the destination end is changed, when the TCP MSSs at both ends are consistent, in addition to modification of the TCP SEQ/ACK value, the IP address and Port need to be further replaced. For example, as an explicit proxy, WAPGW works as a gateway for a terminal to access the WAP service. During interaction with the SP, the IP address and Port of the WAPGW are used to interact with the SP.

The following takes service processing in a transparent proxy scenario as an embodiment for description. This embodiment takes a case where the data forwarding device is a load balancer for example. The load balancer and the service processing node (Node) perform load balanced distribution and service processing for uplink and downlink data packets between the terminal and the SP. In this embodiment, a default policy of the load balancer is as follows: Uplink and downlink packets are forwarded to the service processing node for processing, and the load balancer selects a relevant routing policy and performs allow processing only after receiving a control command of the service processing node. The routing policy specifically includes:

when the default policy indicates not-allow processing (data packets are forwarded by using a low-speed channel): All uplink and downlink data packets connected at both ends of the terminal side and SP side need to pass through the data forwarding device and service processing node; and when the user level policy and/or connection level policy indicates allow processing (data packets are forwarded by using a high-speed channel): The Node forwards a current packet to the SP after protocol recognition and packet processing, and delivers a control instruction to the SP, where the control instruction is used to indicate that subsequent uplink request and downlink response do not need to be forwarded to the Node; the data forwarding device may directly forward uplink and downlink packets. In the case where a packet is modified by the Node during packet processing, the high-speed data forwarding device needs to record the sequence numbers at both the NAS and SP sides, and an offset in packet modification, and modifies the sequence number of the TCP packet before forwarding uplink and downlink packets.

The following implementation manner takes a case where the service processing node (Node) is specifically a service perform unit (service perform unit, SPU) as an example. For different specific services, the data forwarding procedure includes:

For the P2P service: when the service perform unit (service perform unit, SPU) judges that the protocol is the P2P service after protocol recognition, subsequent request/response does not need to continue to be sent to the SPU for processing. The SPU delivers a control policy to an LC and delivers relevant parameters of the quintuple connection to the LC. The LC executes the allow policy. When subsequent uplink and downlink packets on the TCP connection pass through the LC, the LC directly forwards the packets to the terminal or SP side; in this case, the uplink and downlink packets are not modified, and the SEQ value and ACK value of the TCP in the data packet from the source end do not need to be modified.

For the HTTP service: when the SPU judges that the protocol is the HTTP protocol after protocol recognition, and matches a service rule according to the URL (Universal Resource Locator, URL), it needs to add a front transmission header and adds extended attributes in the HTTP request, so that subsequent packets and downlink response of the request do not need to be processed by the SPU and packets are directly routed by the LC; after the SPU adds the HTTP front transmission header and forwards all service packets at the SPU side to the LC, it delivers a control command to the LC, and delivers relevant parameters of the quintuple connection to the line card LC, and the LC executes the control command; when subsequent uplink and downlink packets on the TCP connection pass through the LC, the LC directly forwards the packets to the terminal or SP side; in this case, uplink packets are modified, and the LC needs to modify the SEQ value and ACK value of the TCP in the data packet from the source end; after ensuring that the TCP SEQ/ACK of the packet may be directly modified on the LC for the connection between the terminal and the service processing node and the connection between the service processing node and the SP, the LC directly forwards packets.

For the RTSP service: when the SPU service perform unit judges that the protocol is the RTSP protocol after protocol recognition, and acquires an IP address and Port information of an RTP data channel negotiated between a client and a streaming media server, as the RTP data packets do not need to be processed by the SPU, the SPU delivers a control policy, and delivers corresponding quintuple information including the IP address and Port of the RTP to the LC, and the LC executes the allow policy.

The following describes how to modify the SEQ value and ACK value of the TCP in the data packet from the source end in the embodiments described earlier with the help of examples:

For example, a terminal user sends a multimedia message service request, and a user number property needs to be added to the HTTP header in the multimedia message service request. The original packet only needs to pass through the low-speed channel, and a user number property is added. Subsequent packets are directly routed through the high-speed channel. However, because a TCP packet sent to the SP is different from the original TCP packet of the terminal after the user number property is added to the original packet, the SEQ value of the TCP needs to be enlarged, and the corresponding ACK value also suffers a change; therefore, both the SEQ and ACK value in the TCP packet exchanged between an MS and the SP need to be modified. The following takes a case where the LC works as the data forwarding device as an example to describe modification of the SEQ and ACK values of the TCP during the procedure for sending a data packet. Assume that an offset added to user data is Payload_len. The SEQ value of the data packet sent by the LC to the SP is as follows: SEQ of the MS+payload_len; the ACK value of the data packet sent by the LC to the SP is as follows: ACK of the SP−payload_len. For the specific example, reference may be made to FIG. 3.

Figure 3:
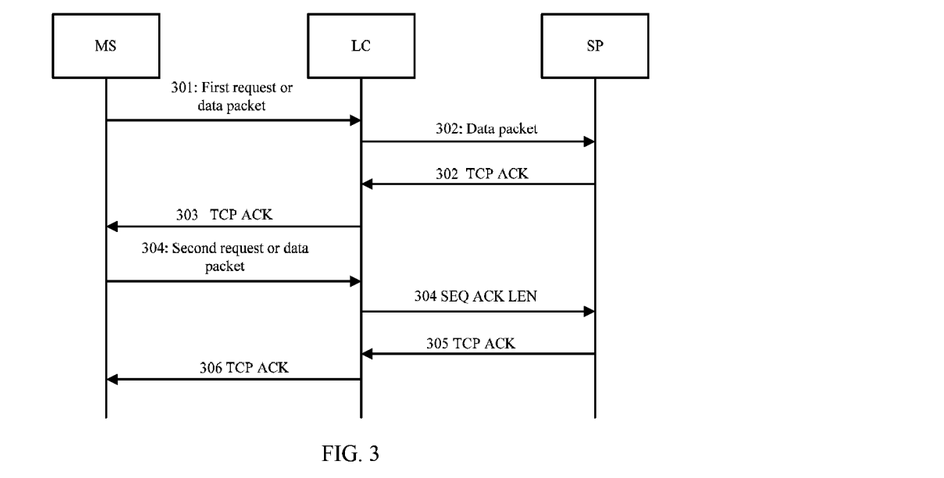
FIG. 3 is a schematic flow chart of a method according to an embodiment of the present invention.

301: A mobile subscriber (mobile subscriber, MS) sends a first request or data packet to the LC, for example, the first request is a multimedia message service request whose SEQ, ACK, and LEN are 1, 1, and 1460.

302: The LC sends the first request or data packet to the SP; the service processing node SP adds mobile directory number (Mobile Directory Number, MDM) front transmission information whose length is 40 bytes to the hypertext transfer protocol (Hypertext Transfer Protocol, HTTP) header of the multimedia message service request (thereby increasing the data payload of the data packet); in this case, the TCP ACK sent by the SP to the LC is 1, 1501, 0.

303: The LC modifies the TCP ACK value according to the offset produced due to increase of the payload, and the TCP ACK value sent to the MS after modification is TCP ACK: 1, 1461, 0.

304: The MS sends a second request or data packet to the LC whose SEQ, ACK, and LEN are 1461, 1, and 500.

305: The LC determines that the subsequent data packet is directly allowed and no longer needs to be sent to the service processing node; the LC calculates the offset, obtains SEQ ACK LEN: 1501, 1, 500, and sends SEQ ACK LEN: 1501, 1, 500 to the SP.

306: The SP returns the TCP ACK: 1, 2101, 0.

307: The LC modifies the ACK value according to the offset of the payload, and sends TCP ACK: 1, 1901, 0 to the MS.

Figure 4:
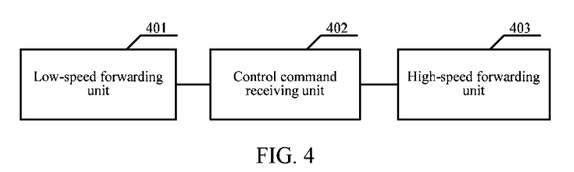
FIG. 4 is a schematic structural diagram of an apparatus according to an embodiment of the present invention.

An embodiment of the present invention provides a data forwarding device in a communications system, as shown in FIG. 4, including:

a low-speed forwarding unit 401, configured to forward a data packet from a source end to a destination end by using a low-speed channel;

a control command receiving unit 402, configured to: during a procedure for forwarding the data packet from the source end to the destination end by using the low-speed channel, receive a control command sent by a service processing node, where the control command is used to indicate that the data packet of the source end does not need to be forwarded to the service processing node; and a high-speed forwarding unit 403, configured to forward the data packet from the source end to the destination end according to the indication of the control command by using a high-speed channel.

Figure 5:
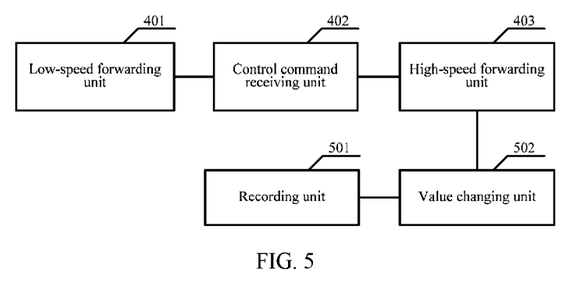
FIG. 5 is a schematic structural diagram of an apparatus according to an embodiment of the present invention.

Furthermore, as shown in FIG. 5, the device further includes:

a recording unit 501, configured to record quintuple information of the source end and destination end, and an offset in data packet modification;

a value changing unit 502, configured to modify a SEQ value and an ACK value of TCP in the data packet from the source end according to the quintuple information of the source end and destination end, and the offset in data packet modification; and the high-speed forwarding unit 403, configured to forward the data packet from the source end to the destination end by using the high-speed channel according to a modification result after modification of the SEQ value and ACK value of the TCP in the data packet from the source end is complete.

Optionally, the value changing unit 502 is specifically configured to: if the quintuple information remains unchanged, modify the SEQ value and ACK value of the TCP in the data packet from the source end; and if the quintuple information is already changed, and a maximum segment size MSS of the TCP at the source end is the same as that at the destination end, modify the SEQ value and ACK value of the TCP in the data packet from the source end and replace an IP address and Port.

Figure 6:
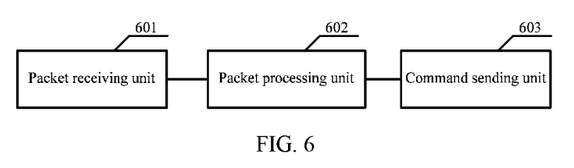
FIG. 6 is a schematic structural diagram of an apparatus according to an embodiment of the present invention.

An embodiment of the present invention further provides a service processing node in a communications system, as shown in FIG. 6, including:

a packet receiving unit 601, configured to receive a data packet from a source end sent by a data forwarding device by using a low-speed channel;

a packet processing unit 602, configured to perform protocol recognition and packet processing for the data packet from the source end, and judge whether data packets subsequently sent by the source end need to be processed by the service processing node; and a command sending unit 603, configured to: if the judgment result of the packet processing unit is no, send a control command to the data forwarding device, where the control command is used to indicate that uplink data packets of the source end do not need to be forwarded to the service processing node, so that the data forwarding device forwards the data packets subsequently sent by the source end to a destination end by using a high-speed channel.

Figure 7:
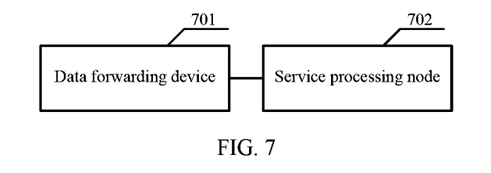
FIG. 7 is a schematic structural diagram of a system according to an embodiment of the present invention.

An embodiment of the present invention further provides a system for forwarding data in a communications system, as shown in FIG. 7, including: a data forwarding device 701 and a service processing node 702, where the data forwarding device 701 is the data forwarding device provided in any one of the embodiments of the present invention, and the service processing node 702 is the service processing node provided in the embodiments of the present invention.

According to this embodiment of the present invention, the service processing node determines whether to continue to forward data by using a low-speed channel after service processing, and then controls the data forwarding device to select a high-speed channel for forwarding the data. In this way, the policy for dynamically controlling data sending is implemented, the manner for controlling the forwarding policy is flexible, and the restrictions during application are few, facilitating wide use.

When the preceding apparatus and system are used, for a single-channel service, after protocol recognition and service processing (for example, for a P2P service), the packet does not need to be modified, the service processing node (Node) may deliver a dynamic rule (control command), and the data forwarding device directly routes and forwards subsequent uplink and downlink packets, thereby reducing the bandwidth requirements and processing pressures for the data forwarding device and Node.

For a single-channel service, after protocol recognition and service processing, for example, hypertext transfer protocol (Hypertext Transfer Protocol, HTTP) service, only certain packets need to be modified. For subsequent uplink and downlink packets, the Node may deliver a dynamic rule, and the data forwarding device records the TCP sequence numbers of the links at the source end and destination end, for example, network access server (Network Access Server, NAS) and SP, and corrects sequence numbers in the uplink and downlink packets according to the offset in packet modification before routing and forwarding.

For a multi-channel service (that is, a service whose control stream and data stream use different links), the data stream generally does not require service processing. A dynamic policy may be delivered so that the data stream is directly forwarded, thereby reducing the bandwidth requirements and processing pressures for the data forwarding device and the Node.

Persons of ordinary skill in the art should understand that all or part of the steps of the methods provided in the embodiments above may be implemented by a program instructing relevant hardware. The program may be stored in a computer readable storage media. The storage media may be a read-only memory, a magnetic disk, and an optical disk, Persons of ordinary skill in the art may understand that the data forwarding device, service processing node, and the system for forwarding data composed of by them in each embodiment may be properly scattered or integrated physically. The modules in each apparatus may be set on a physical entity or multiple physical entities according to their functions.

Persons of ordinary skill in the art may understand that the data forwarding device, service processing node, and the system for forwarding data composed of by them in each embodiment may be properly scattered or integrated physically. The modules in each apparatus may be set on a physical entity or multiple physical entities according to their functions. The apparatus may implement the method as shown in FIG. 1, FIG. 2, and FIG. 3, and recorded in embodiments. Its working principle is not described herein.

A method, an apparatus, and a system for forwarding data provided in the embodiments of the present invention are described in detail above. Several specific examples are used to illustrate the principles and implementation manners of the present invention. The description of the embodiments is used to help understand the method, apparatus, system, and their core principles in the present invention. For persons of ordinary skill in the art, changes may be made to the specific implementation manners and application scope according to the principle of the present invention. In summary, the content of this Specification shall not be comprehended as restriction on the present invention.

What is claimed is:

1. A method for forwarding data in a communications system, comprising:

forwarding, by a data forwarding device, a data packet from a source end to a destination end by using a low-speed channel;

during a procedure for forwarding the data packet from the source end to the destination end by using the low-speed channel, receiving, by the data forwarding device, a control command sent by a service processing node, wherein the control command is used to indicate that the data packet of the source end does not need to be forwarded to the service processing node; and forwarding, by the data forwarding device, the data packet from the source end to the destination end according to the indication of the control command by using a high-speed channel, wherein when the data packet is already modified by the service processing node, forwarding the data packet from the source end to the destination further comprises:

recording quintuple information of the source end and the destination end, and an offset in data packet modification;

modifying an offset sequence number (SEQ) value and a response acknowledge number (ACK) value of a transmission control protocol (TCP) sequence in the data packet from the source end according to the quintuple information of the source end and the destination end, and the offset in the data packet modification, and forwarding the data packet from the source end to the destination end by using the high-speed channel according to the offset SEQ value and the response ACK value after the data packet modification.

2. The method according to claim 1, wherein the modifying the offset SEQ value and the response ACK value of the TCP in the data packet from the source end comprises:

if the quintuple information remains unchanged, modifying the SEQ value and ACK value of the TCP in the data packet from the source end; and if the quintuple information is already changed, and a maximum segment size (MSS) of the TCP at the source end is the same as that at the destination end, modifying the offset SEQ value and the response ACK value of the TCP in the data packet from the source end and replacing an IP address and Port.

3. A method for forwarding data in a communications system, comprising:

receiving, by a service processing node, a data packet from a source end sent by a data forwarding device by using a low-speed channel;

performing, by the service processing node, protocol recognition and packet processing for the data packet, and judging whether data packets subsequently sent by the source end need to be processed by the service processing node; and if the data packets subsequently sent by the source end do not need to be processed by the service processing node, sending a control command to the data forwarding device, wherein the control command is used to indicate that uplink data packets of the source end do not need to be forwarded to the service processing node, so that the data forwarding device forwards the data packet from the source end to a destination end by using a high-speed channel;

wherein when the data packet is already modified by the service processing node the data forwarding device forwarding the data packet from the source end to the destination further comprises:

recording quintuple information of the source end and the destination end, and an offset in data packet modification;

modifying an offset sequence number (SEQ) value and a response acknowledge number ACK value of a transmission control protocol TCP sequence in the data packet from the source end according to the quintuple information of the source end and the destination end, and the offset in the data packet modification, and forwarding the data packet from the source end to the destination end by using the high-speed channel according to the offset SEQ value and the response ACK value after the data packet modification.

4. The method according to claim 3, wherein when the data packet belongs to a point-to-point (P2P) service, the data forwarding device is a line card, and the service processing node is a service perform unit, the sending the control command to the data forwarding device comprises:

judging that the protocol is the P2P service, and a subsequent request/response does not need to continue to be sent to the service perform unit for processing;

delivering, by the service perform unit, a control policy to the line card;

delivering, by the service perform unit, relevant parameters of a quintuple connection to the line card; so as the line card executes an allow policy;

when subsequent uplink and downlink packets on a transmission control protocol (TCP) connection pass through the line card, directly forwarding, by the line card, the subsequent uplink and downlink packets to a terminal or service provider side;

wherein the uplink and downlink packets are not modified, and a sequence number (SEQ) value and an acknowledge number (ACK) value of the TCP connection in the data packet from the source end do not need to be modified.

5. The method according to claim 3, wherein when the data packet belongs to a HyperText Transfer Protocol (HTTP), the data forwarding device is a line card, and the service processing node is a service perform unit, the sending the control command to the data forwarding device comprises:

judging, by the service perform unit, that the protocol is the HTTP protocol, matching to a service rule according to a Universal Resource Locator (URL);

adding a front transmission header and extended attributes in an HTTP request, so that subsequent packets and a downlink response of the request do not need to be processed by the service perform unit, and the subsequent packets are directly routed by the line card;

after the service perform unit adds an HTTP front transmission header and forwards all service packets at the service perform unit side to the line card, delivering, by the service perform unit, a control command to the line card, and delivering relevant parameters of the quintuple connection to the line card, so as the line card executes the control command;

when subsequent uplink and downlink packets on a transmission control protocol (TCP) connection pass through the line card, directly forwarding, by the line card, the subsequent uplink and downlink packets to the terminal or the service provider side;

wherein uplink packets are modified, the line card needs to modify a sequence number (SEQ) value and an acknowledge number (ACK) value of the TCP connection (TCP SEQ/ACK) in the data packet from the source end, so that after ensuring that the TCP SEQ/ACK of the packet is directly modified on the line card for a connection between the terminal, and the service perform unit and a connection between the service perform unit and a service provider, the line card directly forwards packets.

6. The method according to claim 3, wherein when the data packet belongs to a Real-time Transport Streaming Protocol (RTSP), the data forwarding device is a line card, and the service processing node is a service perform unit, the performing, by the service processing node, the protocol recognition and the packet processing for the data packet, and the judging whether the data packets subsequently sent by the source end need to be processed by the service processing node comprises:

judging, by the service perform unit, that the protocol is the RTSP protocol, and acquiring an IP address and Port information of a Real-time Transport Protocol (RTP) data channel negotiated between a client and a streaming media server;

if RTP data packets do not need to be processed by the service perform unit, delivering, by the service perform unit, a control policy, and delivering corresponding quintuple information comprising the IP address and Port of the RTP to the line card, and executing, by the line card, an allow policy.

7. A data forwarding device in a communications system, comprising:

a low-speed forwarding unit, configured to forward a data packet from a source end to a destination end by using a low-speed channel;

a control command receiving unit, configured to: during a procedure for forwarding the data packet from the source end to the destination end by using the low-speed channel, receive a control command sent by a service processing node, wherein the control command is used to indicate that the data packet of the source end does not need to be forwarded to the service processing node; and a high-speed forwarding unit, configured to forward the data packet from the source end to the destination end according to the indication of the control command by using a high-speed channel, wherein when the data packet is already modified by the service processing node, the high-speed forwarding unit is further configured to:

record quintuple information of the source end and the destination end, and an offset in data packet modification;

modify an offset sequence number (SEQ) value and a response acknowledge number (ACK) value of a transmission control protocol (TCP) sequence in the data packet from the source end according to the quintuple information of the source end and the destination end, and the offset in the data packet modification, and forward the data packet from the source end to the destination end by using the high-speed channel according to the offset SEQ value and the response ACK value after the data packet modification.

8. The device according to claim 7, further comprising:

a recording unit, configured to record quintuple information of the source end and destination end, and an offset in data packet modification;

a value changing unit, configured to modify a sequence number (SEQ) value and an acknowledge number (ACK) value of a transmission control protocol (TCP) sequence in the data packet from the source end, according to the quintuple information of the source end and the destination end, and the offset in the data packet modification; and the high-speed forwarding unit, configured to forward the data packet from the source end to the destination end by using the high-speed channel according to the SEQ value and the ACK value after the data packet modification.

9. The device according to claim 8, wherein:

the value changing unit is configured to: if the quintuple information remains unchanged, modify the SEQ value and the ACK value of the TCP sequence in the data packet from the source end; and if the quintuple information is already changed, and a maximum segment size (MSS) of the TCP sequence at the source end is the same as that at the destination end, modify the SEQ value and the ACK value of the TCP sequence in the data packet from the source end and replace an IP address and Port.

* * * * *

UNITED STATES PATENT AND TRADEMARK OFFICE
CERTIFICATE OF CORRECTION

PATENT NO. : 9,100,279 B2
APPLICATION NO. : 13/928906
DATED : August 4, 2015
INVENTOR(S) : Xinyu Ge Page 1 of 1

It is certified that error appears in the above-identified patent and that said Letters Patent is hereby corrected as shown below:

In the claims,

Column 13, line 7, "node the" should read -- node, the --.

Column 13, line 14, "ACK" should read -- (ACK) --.

Column 13, line 15, "TCP" should read -- (TCP) --.

Signed and Sealed this
Twenty-first Day of June, 2016

Michelle K. Lee
*Director of the United States Patent and Trademark Office*